United States Patent
Savu et al.

(10) Patent No.: US 9,670,953 B2
(45) Date of Patent: Jun. 6, 2017

(54) COMPONENT WITH DEFORMABLE PADS

(71) Applicants: Virgiliu-Adrian Savu, Allen Park, MI (US); Timothy E. Geiman, South Lyon, MI (US); Allan Keeble, Valdese, NC (US); Timothy Laughlin, Plymouth, MI (US)

(72) Inventors: Virgiliu-Adrian Savu, Allen Park, MI (US); Timothy E. Geiman, South Lyon, MI (US); Allan Keeble, Valdese, NC (US); Timothy Laughlin, Plymouth, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 24 days.

(21) Appl. No.: 14/442,452

(22) PCT Filed: Nov. 18, 2013

(86) PCT No.: PCT/US2013/070546
§ 371 (c)(1),
(2) Date: May 13, 2015

(87) PCT Pub. No.: WO2014/078783
PCT Pub. Date: May 22, 2014

(65) Prior Publication Data
US 2016/0273589 A1    Sep. 22, 2016

Related U.S. Application Data

(60) Provisional application No. 61/728,112, filed on Nov. 19, 2012.

(51) Int. Cl.
*F16C 35/00* (2006.01)
*F16C 9/04* (2006.01)
(Continued)

(52) U.S. Cl.
CPC ............. *F16C 9/045* (2013.01); *F16C 7/023* (2013.01); *F16C 9/04* (2013.01); *F16C 35/02* (2013.01); *F16C 35/04* (2013.01); *F16C 2226/60* (2013.01)

(58) Field of Classification Search
CPC ...... F16C 7/02; F16C 9/02; F16C 9/04; F16C 9/045; F16C 23/02; F16C 23/04;
(Continued)

(56) References Cited

U.S. PATENT DOCUMENTS 2,404,409 A * 7/1946 Smith ................. A45C 13/008
                                                       131/225
2,836,470 A * 5/1958 Sheppard ................ F16C 9/04
                                                       384/430
(Continued)

FOREIGN PATENT DOCUMENTS

EP      0 696 688 A1     2/1996
JP      H07 305716 A    11/1995

OTHER PUBLICATIONS

PCT International Search Report and Written Opinion under date of mailing of Jan. 24, 2014, in connection with PCT/US2013/070546.
The State Intellectual Property Office of the People's Republic of China, Notice on the First Office Action (with translation) for corresponding Chinese Application No. 201380059910.0, dated Sep. 23, 2016, 17 pages.

*Primary Examiner* — James Pilkington
(74) *Attorney, Agent, or Firm* — Quarles & Brady LLP

(57) ABSTRACT

A component (10) is adapted for contact with a mating component (50) during attachment of the components to one another to form a related assembly in which a deformable pad (26) or pads improve stress distribution. The component includes a body having an interface surface in which the body is adapted to be contacted with the mating component at the interface surface of the body. One or more deformable pads are formed in the interface surface. Each deformable pad has a top surface that is offset outwardly from the interface surface relative to the body and a groove surround-
(Continued)

ing the deformable pad that is offset inwardly from the interface surface relative to the body.

20 Claims, 2 Drawing Sheets

(51) Int. Cl.
*F16C 7/02* (2006.01)
*F16C 35/02* (2006.01)
*F16C 35/04* (2006.01)

(58) Field of Classification Search
CPC ...... F16C 35/02; F16C 2226/60; F16C 7/023; F16C 35/04
See application file for complete search history.

(56) References Cited

U.S. PATENT DOCUMENTS

| | | | |
|---|---|---|---|
| 6,431,759 B1 | 8/2002 | Luchner et al. | |
| 6,471,406 B1 * | 10/2002 | Cadle | F16C 9/02 384/433 |
| 9,273,733 B2 * | 3/2016 | Draxler | F16C 35/02 |
| 2004/0074335 A1 * | 4/2004 | Whitney | F16C 7/023 74/579 R |
| 2011/0158569 A1 | 6/2011 | Dickinger et al. | |
| 2012/0193901 A1 * | 8/2012 | Jouta | F16C 35/02 280/775 |

* cited by examiner

COMPONENT WITH DEFORMABLE PADS

CROSS-REFERENCE TO RELATED APPLICATIONS

This application represents the national stage entry of PCT International Application No. PCT/US2013/070546 filed Nov. 18, 2013, which claims the benefit of the filing date of U.S. Provisional Patent Application No. 61/728,112 filed on Nov. 19, 2012, the disclosures of which are hereby incorporated by reference for all purposes in their entirety for all purposes.

STATEMENT OF FEDERALLY SPONSORED RESEARCH OR DEVELOPMENT

Not applicable.

BACKGROUND

This invention relates to features on a surface of a component in which the surface of the component is brought into contact with another surface under clamping pressure or load.

Components are frequently connected to one another by bolts or other fasteners. As one example, a bearing cap may be mounted, connected, or otherwise attached to a mating component in order to capture a bearing element between a pair of semi-circular surfaces found on the bearing cap and the mating component, respectively. Typically, the bearing cap is attached to the mating component by passing bolts through two legs of the bearing cap in which the two legs straddle the semi-circular area into which the bearing element is received. Upon the tightening of these bolts, the bearing element is captured between the bearing cap and the mating element.

In this example, in order to properly balance the stresses during attachment, it is often necessary to carefully control the manner in which the bolts are tightened down. If the bolt on one of the sides is tightened down too tightly before the bolt on the other side is sufficiently tightened down, then it is possible that the bearing element received between the bearing cap and the mating element may be subjected to an uneven stress around its circumference and this uneven stress could force the bearing out of a round shape. Because the bearings element are precision components, even modest deformation out of a round shape can be potentially harmful to the bearing elements and render the bearing element less efficient or non-operational.

Additionally, uneven tightening of the bolts during assembly of the two mating components can also result in cracking or fracture of the bearing cap. If the bolts are not evenly tightened down during assembly, then the bearing cap may be subjected to differential stresses in the legs of the bearing cap in such a way that the bearing cap was not engineered to withstand.

Accordingly, it has become conventional for the two bolts to be tightened down simultaneously during assembly in such a way as to inhibit the development of differential stresses across the legs. However, such simultaneous tightening can be complex to implement and, if not performed correctly, can still result in the application of uneven stresses that can damage the components being assembled.

Thus, a need remains for improved ways of joining multiple components to one another while avoiding many of the problems created when differential stresses are induced during the assembly process.

SUMMARY OF THE INVENTION

In order to provide improved control over the stresses induced during the assembly of components, powder metal components are disclosed which have one or more deformable pads formed on a surface thereof. These deformable pads are formed on a surface of the component and are configured to contact a surface of another component under compaction or pressure at an interface between the two components. The top surface of the deformable pad is initially disposed above the interface surface of the component (i.e., away from the body of the component), such that, the pad is deformable downward into the surface of the component as two components are brought into contact with one another under load. There may be a moat or "trash groove." which accommodates the deformation of the pad in a direction generally perpendicular to the direction of the applied load into the body of the component.

According to one aspect of the invention, a component is disclosed for contact with a mating component during attachment of the components to one another. The component includes a body having an interface surface in which the body is adapted to be contacted with the mating component at the interface surface of the body. The component has one or more deformable pads formed in the interface surface. The deformable pad or pads each have a top surface that is offset outwardly from the interface surface relative to the body. The deformable pad or pads each also have a groove surrounding respective pad in which the groove is offset inwardly from the interface surface relative to the body.

The component may be a powder metal component and the body may be a powder metal body. In some forms, the powder metal component may be aluminum or an aluminum alloy.

In one specific form, the component may be a bearing cap for a half shaft. The bearing cap may include a pair of bolt holes. There may be two deformable pads proximate an opening of each bolt hole at the interface surface. Centers of the two deformable pads may be separated 180 degrees from one another about the opening of each bolt hole. In some forms, the two deformable pads may be positioned along a line extending through the axes of the two bolt holes.

According to another aspect of the invention, a component of the type described above may be attached with a mating component to form an assembly. The assembly includes a component including a body having an interface surface with one or more deformable pads formed in the interface surface. Each deformable pad has a top surface that is offset outwardly from the interface surface relative to the body and a groove surrounding the deformable pad that is offset inwardly from the interface surface relative to the body. The assembly further includes a mating component having an interface surface. The interface surface of the body of the component contacts the interface surface of the mating component (or the interface surfaces contact a gasket therebetween). In order for the interface surfaces to contact one another (or the gasket), the component and mating component are connected together under an applied load to deform the deformable pad or pads.

In order to join the component and the mating component, the assembly can further include bolts that fasten the component to the mating component. These bolts may create the applied load to deform the deformable pad or pads such that the interface surfaces contact one another. It is contemplated that in other types of assemblies, fasteners other than bolts might be applied or that a clamping force may be otherwise created between the component and the mating component.

It is contemplated that in order to better accommodate the deformation of the deformable pad or pads, the materials of the assembly may be selected such that the mating component is harder and less deformable than the component with the deformable pads. In this way, the deformable pad or pads can be ensured to be the feature that exhibits the most deformation.

Again, it is contemplated that one or both of the component and the mating component may be powder metal components (that is, may be powder metal components made using powder metal processes such as compacting and sintering of powder metal to form a unitary powder metal body). In some forms, the powder metal component may be made of aluminum or may be an aluminum alloy.

In the assembly, the component may be a bearing cap for a half shaft and include a pair of bolt holes for attachment of the component and mating component using bolts. Deformable pads of various arrangements and configurations may be placed along the interface surface and, in particular, in the region of the bolt holes.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 3c illustrates the initial deformation of the deformable pad under an applied compressive load.

DETAILED DESCRIPTION

Figure 1:
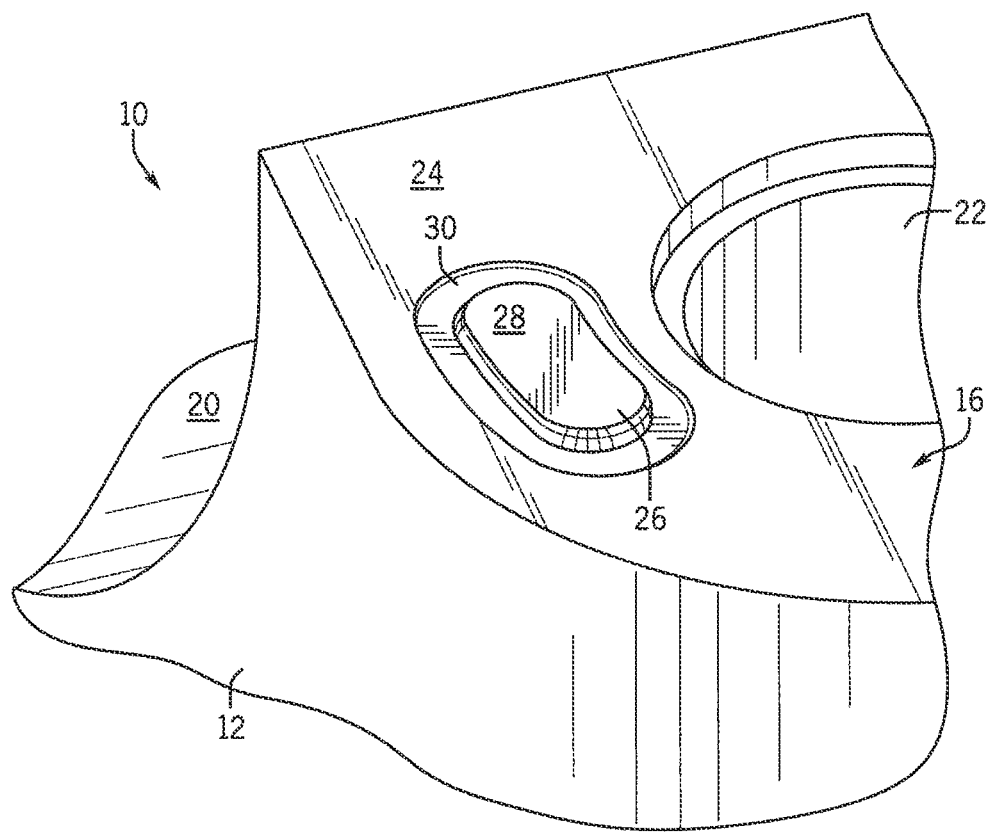
FIG. 1 is a perspective view of a deformable pad formed on an interface surface of an end of a leg of a powder metal component in the form of a bearing cap.

Referring first to FIG. 1, one end of an exemplary bearing cap 10 is illustrated in perspective. A bottom view of the entire bearing cap 10 is further illustrated in FIG. 2. The bearing cap 10 includes a body 12 having a central section 14 with a first leg 16 and a second leg 18 on opposing sides thereof. As viewable from the bottom side of the bearing cap 10, the central section 14 has a semi-circular surface 20 formed thereon centrally disposed between the two legs 16 and 18 for the reception of a bearing element during the mounting of the bearing cap 10 to a mating component (the mating component will have an opposing semi-circular surface to receive and capture the bearing element between the semi-circular surfaces).

Figure 2:
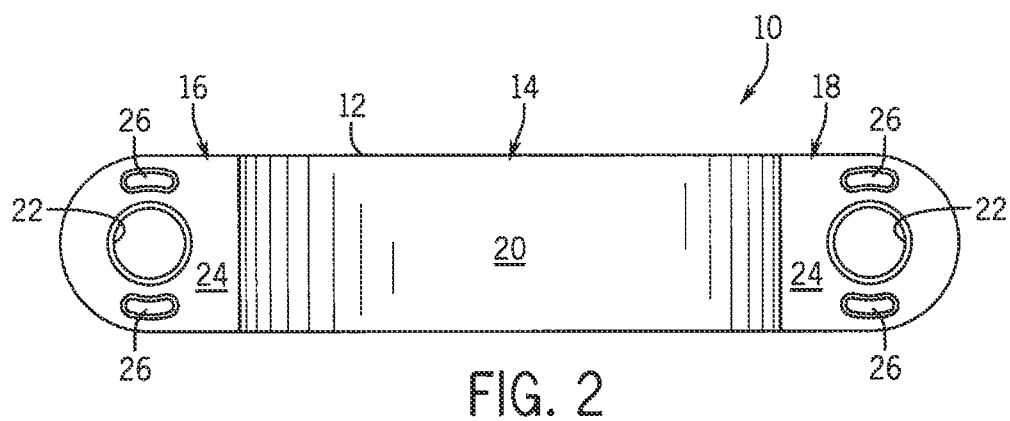
FIG. 2 is a bottom plan view of the bearing cap showing one possible placement of the deformable pads about ends of the two legs.

On the end of the bearing cap 10 detailed in FIG. 1, there is a bolt hole 22 formed through the first leg 16, through which a bolt may extend to attach the bearing cap 10 to the other mating component. Because the end of the leg 16 shown in FIGS. 1 and 2 is at the end of the bearing cap 10 facing the mating component, the threaded end of the bolt will extend through and from the opening illustrated in these figures for threaded insertion into an opening of the mating component. An interface surface 24 on the end of the leg 16 surrounds the opening of the bolt hole 22 and this interface surface 24 is generally perpendicular to the axis of the bolt hole 22.

In FIG. 2, a bolt hole 22 and interface surface 24 are illustrated on the end of the second leg 18 similar to the bolt hole 22 and interface surface 24 found on the end of the first leg 16. Thus, in the form illustrated, the two legs 16 and 18 are generally symmetrical about the central section 14 of the bearing cap 10.

Returning now to the detail of the first end 16 illustrated in FIG. 1, a deformable pad 26 is shown as being positioned on the interface surface 24 around the bolt hole 22. Although only one deformable pad 26 is shown in FIG. 1 given the particular area of illustration, multiple pads 26 around each of the bolt holes 22 may be present as is better illustrated in FIG. 2. In the embodiment shown, these deformable pads 26 are positioned on opposite sides of each of the bolt holes 22 and the pads 26 are separated 180 degrees apart about the central axis of the bolt hole 22. In some forms, these pads 26 may be disposed along a centerline extending through both bolt hole axes to avoid torsional stresses on the part being clamped (that is, the bearing element). However, in the form illustrated, the pads 26 are rotated 90 degrees from this centerline. The pads 26 may take other arrangements about the bolt holes. For example, the pads 26 rotated approximately 45 degrees to the centerline on the interface surfaces. Alternatively, these pads 26 may be in different quantities or arrangements. For example, there may be three, four or more pads 26 around each of the bolt holes 22.

Moreover, nothing should limit the pads 26 the specific bean shape illustrated in FIGS. 1 and 2. The pads 26 may take any one of a number of different shapes. In one particular form, the deformable pad 26 may be doughnut-shaped and form a ring at the interface surface 24 around the opening of the bolt hole 22.

The top peak, top plateau, or top surface 28 of the deformable pad 26 extends away the body 12 of the bearing cap 10 relative to the interface surface 24. In the particular form illustrated, the top surface 28 is parallel with the interface surface 24 and is offset outwardly relative to the body 12 (that is, away from the volume of the material found in the body 12). This top surface 28 defines the initial area of contact between the bearing cap 10 (or whatever component it is disposed on) and the mating component.

Preferably, the deformable pad or pads 26 are integral with the powder metal body 12. Each deformable pad 26 comprises a stem which can be composed of the same material as the base component or of a dissimilar material, as may be the case in a composite component in which more than one type of material is used to form the component. The function of the stem is to undergo elastic-plastic deformation with progressively enlarging its cross-sectional area under compressive loads and to progressively resist deformation (plastic yield) under increasing loads.

The deformable pad 26 further includes a trash groove 30 or moat surrounding the area of the deformable pad 26. This groove 30 is offset toward the body 12 of the bearing cap 10 relative to the interface surface 24. The groove 30 is designed to accommodate the laterally outward deformation or mushrooming of the deformation pad 26 under a compressive load or clamping force during the assembly of the bearing cap 10 to the mating component in which the top surface 28 of the deformable pad 26 is compressed against the interface surface of the mating component. This deformable pad 26 and the trash groove 30 can be geometrically sized to limit and control the relative displacement of the component (in the instant example, the bearing cap 10) with respect to the interface surface of another mating component as the component and the mating component are subjected to clamping or tightening loads during the assembly of the components together. The groove 30 is located at the base of the stem of the deformable pad 26 and can permit the stem to expand or be deformed entirely below the interface surface 24 when the interface surface 24 is in contact with the mating component. This means the interface surface 24 of the component having the deformable pads 26 and the corresponding surface of the other mating component may be made flush with one another as long as the groove 30 is designed to have sufficient volume to receive the volume of the stem or pad 26 initially above the interface surface 24.

The overall function of the pads 26 are to minimize the displacement of the interfacing components subjected to a unique load range thereby reducing the maximum stresses and the stress range associated with any over-constraints subjected to the bodies except the locus of applied loads and interface contact. It is contemplated that the materials selected for each of the components and the design parameters of the deformable pad and corresponding trash groove may be selected to achieve the desired deformation profile over the range of loads during clamping.

The deformable pad or pads 26 can be produced in a powder metal component, in this example the bearing cap 10, during compaction and sintering of a powder metal material to form the powder metal component. The tooling used to compact the powder may have the negative form of the deformation pad or pads formed in it so that the deformation pad or pads are formed in the preform during the compaction step, prior to sintering. Often, the fabrication steps for forming the powder metal component can also include other additional processing steps. For example, these other processing steps may include finishing steps such as drilling to establish the final dimensions of bolt holes 22 or grinding to establish flatness of particular surfaces of the component.

Where the component containing the deformable pads 26 is formed from a powder metal material, this may leave the component less than fully dense, as powder metal components typically have some amount of porosity, even after sintering. In one particular embodiment, the component may be a powder metal component made using liquid phase sintering and may have a density of 98% of theoretical density.

It should further be appreciated that the materials of the components can be selected to ensure that the deformable pad deforms elastically or plastically rather than is pressed or indented into the surface of the mating component. Accordingly, the deformable pad may be made of a comparably softer or more deformable material than the material of the mating component, which may be made of a comparably harder or less deformable material. In one embodiment, the component having the deformable pads may comprise aluminum or an aluminum alloy. In some forms, the deformable pads may have a density different than the majority of the bulk of the component, making the deformable pads comparably more easily deformable. As sintered powder metal parts are usually less than fully dense, powder metal parts often have some internal porosity. In still other forms, the deformable pads might be made of a different powder metal material that is more readily deformable or may be differently treated. For example, the deformable pads of the component might be masked during heat treatment or carburization (that adversely alters deformability) to promote the deformability of the pads relative to other component parts.

To form an assembly including the powder metal component or bearing cap 10, the component is placed against a mating component such that an interface surface of the component faces an interface surface of the mating component. Because the interface surface of the component contains deformable pads, these deformable pads initially contact the interface surface of the mating component. It will be appreciated that in some forms, only one of the components may have deformable pads, while in other forms, both of the components may have deformable pads that contact the opposing interface surface. In any event, the components are then subjected to a compressive load (which may be applied by the tightening of bolts or other such fasteners) in order to draw the component and the mating component together. As this compressive force is applied, the deformable pads mushroom or deform into the trash grooves as the interface surfaces are drawn toward one another. This provides a controlled and predictable application of stress and deformation to the components as they are tightened together.

Eventually, the component having the deformable pad(s) and the mating component may make direct contact with one another at the interface surfaces. In some alternative embodiments, there may be a gasket captured between the two interface surfaces, and the height dimension of the deformable pad or pads as well as its elastic properties may be engineered to apply a desired amount of pressure to the gasket that is captured between the interface surfaces of the components.

In one form, the component assembly may be a spherical bearing cap for a half shaft on a front wheel drive portion of a vehicle. In this case, there typically is a pair of bolt holes that are used to secure the bearing cap to the mating component. For such a component, there may be one or more deformable pads positioned about each of the bolt holes. When bolts holding bearing caps of this type are tightened down, the bolts typically need to be tightened simultaneously to prevent cracking of the bearing cap. The introduction of these deformable pads may improve the ability of the bolts to be separately tightened down without causing damage to the bearing cap.

It is contemplated that the clamping arrangement with deformable pads described in this application could be applied to types of assemblies other than assemblies for capture of a bearing. Moreover, it is contemplated that although the assembly components may preferably include at least one powder metal component, that none, one, or both of the components may be made from powder metal. The components might potentially be made in other ways (for example, casting instead of using powder metal production techniques) and the materials of the two components could be similar (for example, two aluminum or two ferrous powder metal parts might be assembled together) or dissimilar (for example, an aluminum powder metal component might be attached to a ferrous powder metal component).

Figure 3:
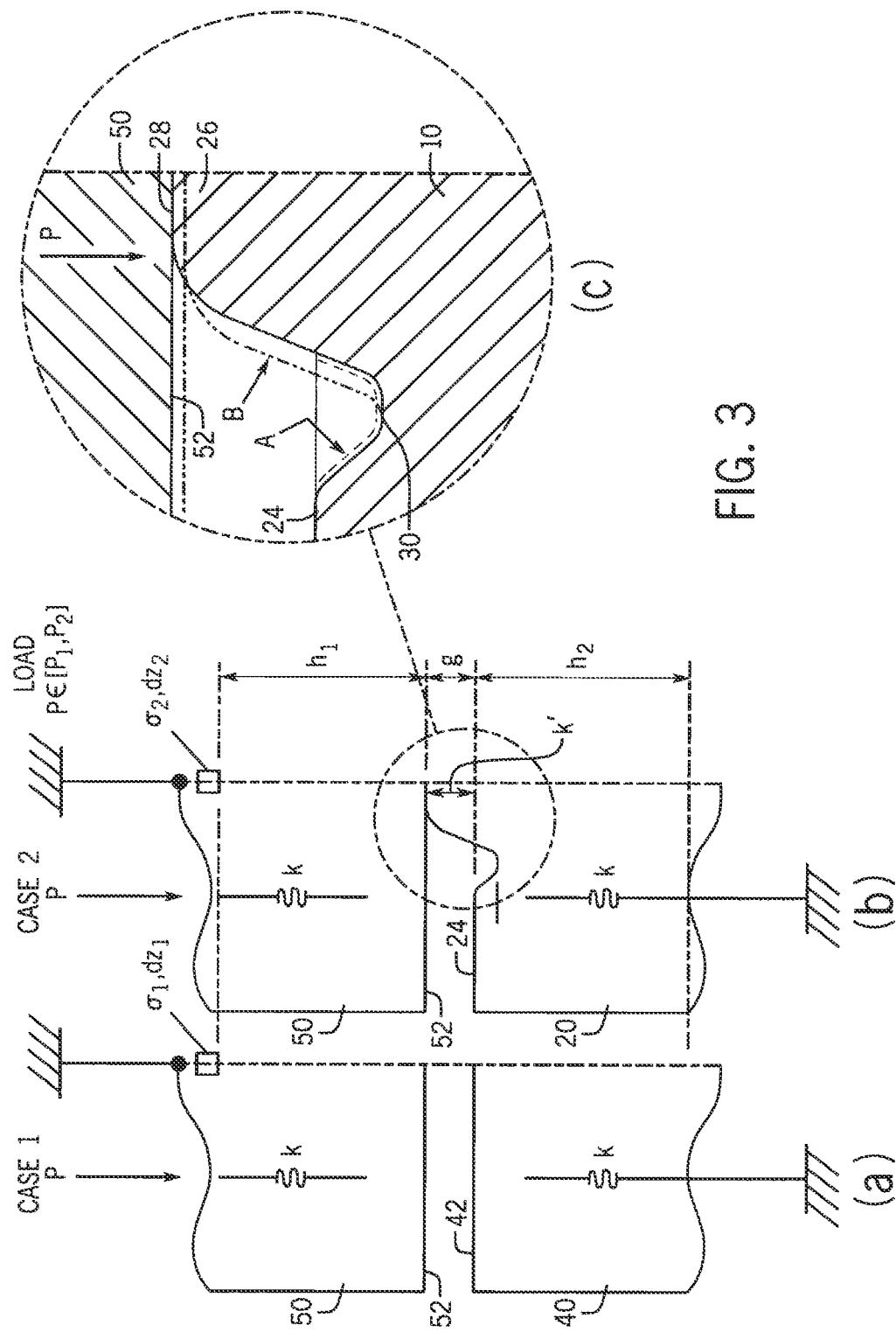
FIG. 3 is an illustration comparing two cases for contact in which in one of the cases illustrated in FIG. 3a (case 1) there is no deformable pad and in the other one of the cases illustrated in FIG. 3b (case 2) there is a deformable pad.

Turning now to FIG. 3, two cases are presented in which the compressive attachment of a component and a mating component are illustrated to form an assembly. In the instance where the component is a bearing cap and the mating component is a component to which a bearing cap is attached by bolts to form an assembly, the compressive force P is the force applied by the bolts used to join the two components.

A first case, case 1, is illustrated in FIG. 3a in which there are no deformable pads on either component. In case 1, a component 40 and a mating component 50 are illustrated just prior to compression of the interface surface 42 of the component against the interface surface 52 of the mating component 50 under a compressive load. P. The component 40 and the mating component 50 each have a spring constant, k, assuming they are made of similar materials. The component 40 has a height $h_1$ and the mating component 50 has a height $h_2$. In case 1, the overall displacement $d_1$ during compression can be modeled by the equation:

$$d_1=(h_1,k)+g+d(h_2,k)$$

where d(h, k) is the displacement of the component under the load P as a function of the height of the component and its spring constant k and where g is the intercomponent spacing.

Compare this to case 2, which is illustrated in FIG. 3*b* and which further includes the deformable pad 26 on one of the components 10. In case 2, the deformable pad 26 has a height, g, which extends above the interface surface 24 of the component 10 and a spring constant k', which may be different that the spring constant k of the material of the mating component 50 and the component 10. Where the components are otherwise similar to the assembly found in case 1, but for the addition of the deformable pad 24, and are subjected to a compressive load P, the displacement $d_2$ can be modeled for case 2 by the equation:

$$d_2=d(h_1,k)+d(g,k')+d(h_2,k)$$

where the term d(g, k') substitutes for the term g from the equation used to model case 1 above and represents the displacement of the deformable pad 26.

As the value of d(g, k') in case 2 is less than or equal to the value of g in case 1 at a given applied load P and the other terms in the equations are similar, it can be said that the stress imposed in the first case at a particular location in one of the components being attached, $\sigma_1$, is believed to be greater than or equal to the stress of imposed on the components in the second case, $\sigma_2$, at a similar location.

With further reference to the detail shown in FIG. 3*c*, the initial deformation of deformable pad 26 can be seen. The solid lines indicate the initial geometry of the component 10 and deformable pad 26. Upon the initial application of the clamping load, the dotted line B indicates the new profile of the deformable pad 26. The deformable pad 26 begins to mushroom or deform outward under the compressive load P and begins to fill the space of the trash groove 30, which is generally denoted at the dotted line A. Upon further compression, the trash groove 30 will continue to fill with the material of the deformable pad 26 until the interface surfaces 24 and 52 come into contact with one another (or an intermediate gasket depending on the particular arrangement). Within this range of deformation (that is, from initial part geometries until the interface surfaces contact one another or an intermediate gasket, if the assembly is so designed), there is very closely controlled deformation and displacement induced under the applied load.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A component for contact with a mating component during attachment of the components to one another, the component comprising:
   a body having an interface surface, the body being adapted to be contacted with the mating component at the interface surface of the body; and
   at least one deformable pad formed in the interface surface and integral with the body, the at least one deformable pad having a top plateau that is offset outwardly from the interface surface relative to the body, a groove surrounding the at least one deformable pad is offset inwardly from the interface surface relative to the body.

2. The component of claim 1, wherein the component is a powder metal component and the body is a powder metal body.

3. The component of claim 2, wherein the powder metal component is composed of aluminum or an aluminum alloy.

4. The component of claim 1, wherein the component is a bearing cap for a half shaft.

5. The component of claim 4, wherein the bearing cap includes a pair of bolt holes.

6. The component of claim 5, wherein each of the pair of bolt holes have two deformable pads proximate thereto at a respective opening thereof at the interface surface.

7. The component of claim 6, wherein a center of the two deformable pads are separated 180 degrees from one another about the opening of each bolt hole.

8. The component of claim 7, wherein each of the bolt holes have a respective axis and the two deformable pads are positioned along a line extending through each respective axis of the two bolt holes.

9. The component of claim 1, wherein the body has a pair of legs each having a respective interface surface on a respective end thereof and wherein the body further has a semi-circular surface centrally disposed between the pair of two legs.

10. An assembly comprising:
    a component including a body having an interface surface with at least one deformable pad formed in the interface surface, the at least one deformable pad having a top surface that is offset outwardly from the interface surface relative to the body, a groove surrounding the at least one deformable pad, wherein the groove is offset inwardly from the interface surface relative to the body;
    a mating component having an interface surface; and
    bolts that fasten the component to the mating component and wherein an applied load to deform the at least one deformable pad is created by the bolts;
    wherein the interface surface of the body of the component contacts the interface surface of the mating component and the component and mating component are connected together under the applied load to deform the at least one deformable pad.

11. The assembly of claim 10, wherein the mating component is harder and less deformable than the component.

12. The assembly of claim 10, wherein at least one of the component and the mating component is a powder metal component.

13. The assembly of claim 12, wherein the powder metal component is composed of aluminum or an aluminum alloy.

14. An assembly comprising:
    a component including a body having an interface surface with at least one deformable pad formed in the interface surface and integral with the body, the at least one deformable pad having a top surface that is offset outwardly from the interface surface relative to the body, a groove surrounding the at least one deformable pad is offset inwardly from the interface surface relative to the body;

a mating component having an interface surface;

wherein the interface surface of the body of the component contacts the interface surface of the mating component and the component and mating component are connected together under an applied load to deform the at least one deformable pad.

15. The assembly of claim 14, wherein the component is a bearing cap and the bearing cap includes a pair of bolt holes.

16. The assembly of claim 15, wherein each of the pair of bolt holes have two deformable pads proximate thereto at a respective opening thereof at the interface surface.

17. The assembly of claim 16, wherein a center of the two deformable pads are separated 180 degrees from one another about the opening of each bolt hole.

18. The assembly of claim 17, wherein each of the bolt holes have a respective axis and the two deformable pads are positioned along a line extending through each respective axis of the two bolt holes.

19. The assembly of claim 14, wherein the component is a bearing cap for a half shaft.

20. The assembly of claim 14, wherein the body has a pair of legs each having a respective interface surface on a respective end thereof and wherein the body further has a semi-circular surface centrally disposed between the pair of two legs.

* * * * *